(12) United States Patent
Luo

(10) Patent No.: US 11,566,123 B2
(45) Date of Patent: Jan. 31, 2023

(54) PROCESS FOR PREPARING POLYPROPYLENE PARTICLES BY USING RECYCLABLE COFFEE GROUNDS PLANT FIBERS

(71) Applicants: SHENZHEN CONSYS SCIENCE & TECHNOLOGY CO., LTD, Shenzhen (CN); Nimble Group (Shanghai) Co., Ltd., Shanghai (CN)

(72) Inventor: Bing Luo, Shenzhen (CN)

(73) Assignees: SHENZHEN CONSYS SCIENCE & TECHNOLOGY CO., LTD, Shenzhen (CN); NIMBLE GROUP (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 17/740,311

(22) Filed: May 9, 2022

(65) Prior Publication Data
US 2022/0411615 A1 Dec. 29, 2022

(30) Foreign Application Priority Data
Jun. 23, 2021 (CN) .......................... 202110698033.8

(51) Int. Cl.
C08L 23/12 (2006.01)
C08L 97/02 (2006.01)

(52) U.S. Cl.
CPC .............. *C08L 23/12* (2013.01); *C08L 97/02* (2013.01)

(58) Field of Classification Search
CPC ...... C08L 23/12; C08L 97/02; C08L 2201/02; C08L 2201/08; A23F 5/12; A23F 5/14
USPC ........................................................... 524/9
See application file for complete search history.

(56) References Cited

U.S. PATENT DOCUMENTS

2018/0249755 A1* 9/2018 Hung ...................... C08L 51/04

FOREIGN PATENT DOCUMENTS

| CN | 105623050 A | | 6/2016 | |
|---|---|---|---|---|
| CN | 108530777 A | | 9/2018 | |
| CN | 110105783 A | | 8/2019 | |
| CN | 110172258 A | | 8/2019 | |
| CN | 110283471 A | | 9/2019 | |
| CN | 111004452 A | * | 4/2020 | ............. C08L 23/14 |
| CN | 111004452 A | | 4/2020 | |
| CN | 111440383 A | | 7/2020 | |
| CN | 112625430 A | | 4/2021 | |

OTHER PUBLICATIONS

Zhongjiu Yang, Properties and market application of polypropylene, Production technology and basic knowledge of hard plastic wood composite low foaming products, 2018, pp. 57.

* cited by examiner

*Primary Examiner* — Ling Siu Choi
*Assistant Examiner* — Ronald Grinsted
(74) *Attorney, Agent, or Firm* — Bayramoglu Law Offices LLC

(57) ABSTRACT

A process for preparing polypropylene particles by using recyclable coffee grounds plant fibers includes the following preparation steps: S1) preparing raw materials; S2) processing the raw materials; S3) mixing the raw materials to obtain a mixture; and S4) performing mixing and extrusion granulation on the mixture. The raw materials in S1 include 35-40 parts of coffee grounds powder, 60-80 parts of polypropylene resin, 2-5 parts of compatibilizer, 4-8 parts of toughening agent, 1-3 parts of diffusing agent, 1-3 parts of maleic anhydride, 0.7-1.6 parts of anti-UV agent, 3-6 parts of antioxidant, and 1-2 parts of white oil. The present disclosure adopts coffee grounds for mixing preparation, the discarded coffee grounds can be reused, the prepared polypropylene particles contain fiber components, and the performance of a material is improved.

9 Claims, 1 Drawing Sheet

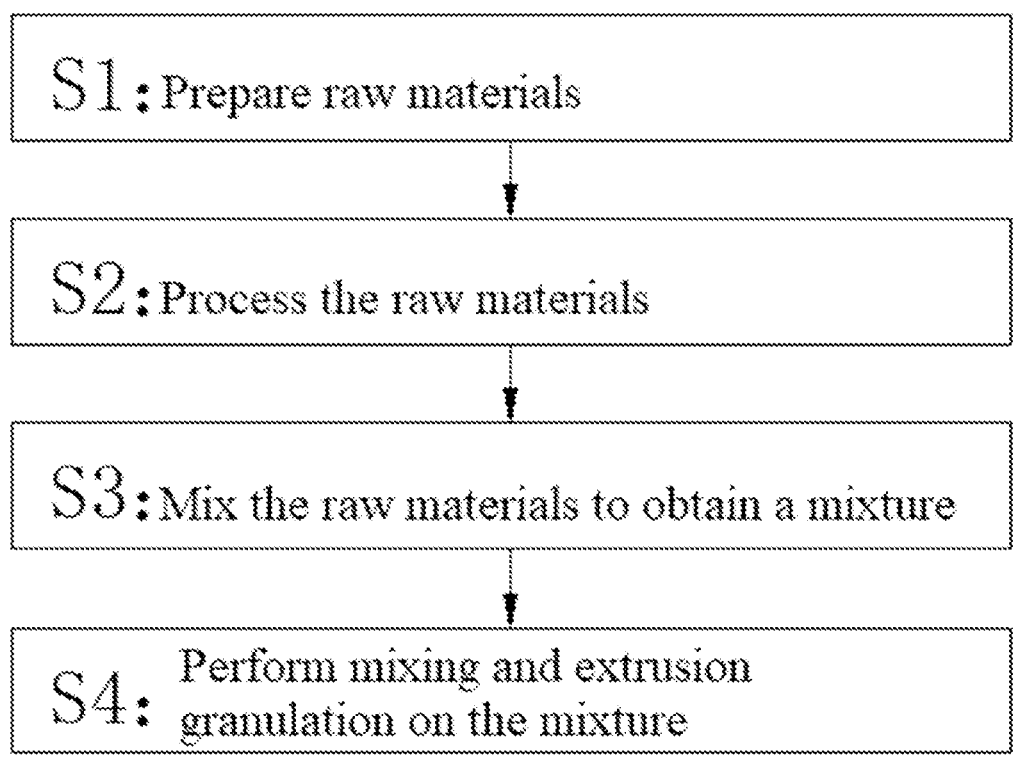

PROCESS FOR PREPARING POLYPROPYLENE PARTICLES BY USING RECYCLABLE COFFEE GROUNDS PLANT FIBERS

CROSS REFERENCE TO THE RELATED APPLICATIONS

This application is based upon and claims priority to Chinese Patent Application No. 202110698033.8, filed on Jun. 23, 2021, the entire contents of which are incorporated herein by reference.

TECHNICAL FIELD

The present disclosure relates to the technical field of polypropylene particle preparation, in particular to a process for preparing polypropylene particles by using recyclable coffee grounds plant fibers.

BACKGROUND

With the upgrading of products and increasing investment in material recycling and reuse and other aspects, polypropylene materials are widely used in medical treatment, automobiles, home appliances, gardens, daily use and other industries due to their low density, excellent heat resistance, good fatigue resistance and low price, and the polypropylene materials are prepared into an instrument that can be recycled and has the advantages of light weight and so on.

The existing polypropylene particle preparation method is complicated, no plant fibers are adopted for preparation, and the environmental protection performance is poor.

SUMMARY

The present disclosure aims to solve the problems that an existing polypropylene particle preparation method is complicated, no plant fibers are adopted for preparation, and the environmental protection performance is poor, and accordingly provides a process for preparing polypropylene particles by using recyclable coffee grounds plant fibers.

In order to implement the above objective, the present disclosure provides the following technical solutions:

A process for preparing polypropylene particles by using recyclable coffee grounds plant fibers includes the following preparation steps:
  S1: preparing raw materials;
  S2: processing the raw materials;
  S3: mixing the raw materials to obtain a mixture; and
  S4: performing extrusion and granulation on the mixture.

Preferably, the raw materials in S1 include 35-40 parts of coffee grounds, 60-80 parts of polypropylene resin, 2-5 parts of compatibilizer, 4-8 parts of toughening agent, 1-3 parts of diffusing agent, 1-3 parts of maleic anhydride, 0.7-1.6 parts of anti-UV agent, 3-6 parts of antioxidant, 1-2 parts of white oil, and 0.1-0.5 part of lubricating agent.

Preferably, the processing the raw materials in S2 includes the following steps:
  first, preparing coffee grounds for cleaning and drying;
  second, pulverizing and grinding the coffee grounds by using a pulverizer and a grinder;
  third, screening the coffee grounds powder by using a 150-mesh screen; and
  fourth, weighing out the appropriate coffee grounds powder.

Preferably, the coffee grounds are washed and cleaned, baked at high temperature to remove grease and be sterilized, and dried at 180-220° C. for 30-40 min to obtain semi-carbonized coffee grounds.

Preferably, the coffee grounds are first pulverized by using the pulverizer, and then ground by using the grinder, after guiding out, the 150-mesh screen is used for screening, and the neat and uniform coffee grounds powder is collected.

Preferably, the mixing the raw materials in S3 includes the following steps:
  first, adding the coffee grounds powder and the polypropylene resin into a mixer for primary mixing, performing modification, and intermittently adding the compatibilizer;
  second, adding the remaining raw materials into the mixer for secondary mixing; and
  third, collecting the mixture and guiding the mixture into a double-screw extruder.

Preferably, during the primary mixing, a mixing temperature is set at 40-50° C., a rotating speed is 260-300 r/min, mixing is performed for 20-25 min, and the polypropylene resin is modified with coffee grounds powder fibers.

Preferably, a funnel is used, an electromagnetic valve is disposed on the funnel, the funnel is opened intermittently so that the compatibilizer is intermittently added into the mixer, and mixed with the coffee grounds powder and the polypropylene resin, and a modification effect is improved.

Preferably, during the secondary mixing, a mixing temperature is set at 60-70° C., a rotating speed is 360-500 r/min, and mixing is performed for 10-20 min.

Preferably, in S4, the mixture is added to a double-screw extruder, a strip material is extruded under conditions with a temperature of 170-200° C., a rotating speed of 260-300 r/min, and a main feeding frequency of 7-9 Hz, and after cooling with cold water, pelletizing is performed by using an extrusion pelletizer, a rotating speed of the extruder pelletizer is 100-130 Hz/min, and the polypropylene particles are prepared.

Compared with the prior art, the present disclosure has the advantages:

The present disclosure adopts the coffee grounds for mixing preparation, the discarded coffee grounds can be reused, the prepared polypropylene particles contain fiber components, and the performance of a material is improved.

BRIEF DESCRIPTION OF THE DRAWINGS

FIGURE is a flow diagram of a process for preparing polypropylene particles by using recyclable coffee grounds plant fibers provided by the present disclosure.

DETAILED DESCRIPTION OF THE EMBODIMENTS

The technical solutions of embodiments of the present disclosure will be described clearly and completely in combination with the accompanying drawings of the embodiments of the present disclosure. Apparently, the described embodiments are some, but not all, embodiments of the present disclosure.

Embodiment 1

Referring to the FIGURE, a process for preparing polypropylene particles by using recyclable coffee grounds plant fibers includes the following preparation steps:
  S1: raw materials are prepared;
  S2: the raw materials are processed;

S3: the raw materials are mixed to obtain a mixture; and

S4: extrusion and granulation are performed on the mixture.

In the embodiment, the raw materials in S1 include 35 parts of coffee grounds, 60 parts of polypropylene resin, 2 parts of compatibilizer, 4 parts of toughening agent, 1 part of diffusing agent, 1 part of maleic anhydride, 0.7 part of anti-UV agent, 3 parts of antioxidant, 1 part of white oil, and 0.1 part of lubricating agent.

In the embodiment, processing the raw materials in S2 includes the following steps:

first, coffee grounds are prepared for cleaning and drying;

second, the coffee grounds are pulverized and ground by using a pulverizer and a grinder;

third, the coffee grounds powder is screened by using a 150-mesh screen; and fourth, the appropriate coffee grounds powder is weighed out.

In the embodiment, the coffee grounds are washed and cleaned, baked at high temperature to remove grease and be sterilized, and dried at 180-220° C. for 30-40 min to obtain semi-carbonized coffee grounds.

In the embodiment, the coffee grounds are first pulverized by using the pulverizer, and then ground by using the grinder, after guiding out, the 150-mesh screen is used for screening, and the neat and uniform coffee grounds powder is collected.

In the embodiment, mixing the raw materials in S3 includes the following steps:

first, the coffee grounds powder and the polypropylene resin are added into a mixer for primary mixing, modification is performed, and the compatibilizer is intermittently added;

second, the remaining raw materials are added into the mixer for secondary mixing; and third, the mixture is collected and guided into a double-screw extruder.

In the embodiment, during the primary mixing, a mixing temperature is set at 40° C., a rotating speed is −300 r/min, mixing is performed for 20 min, and the polypropylene resin is modified with coffee grounds powder fibers.

In the embodiment, a funnel is used, an electromagnetic valve is disposed on the funnel, the funnel is opened intermittently so that the compatibilizer is intermittently added into the mixer, and mixed with the coffee grounds powder and the polypropylene resin, and a modification effect is improved.

In the embodiment, during the secondary mixing, a mixing temperature is set at 60° C., a rotating speed is 360 r/min, and mixing is performed for 10 min.

In the embodiment, in S4, the mixture is added to a double-screw extruder, a strip material is extruded under conditions with a temperature of 170-200° C., a rotating speed of 260-300 r/min, and a main feeding frequency of 7-9 Hz, and after cooling with cold water, pelletizing is performed by using an extrusion pelletizer, a rotating speed of the extruder pelletizer is 100-130 Hz/min, and the polypropylene particles are prepared.

Embodiment 2

Referring to the FIGURE, a process for preparing polypropylene particles by using recyclable coffee grounds plant fibers includes the following preparation steps:

S1: raw materials are prepared;

S2: the raw materials are processed;

S3: the raw materials are mixed to obtain a mixture; and

S4: extrusion and granulation are performed on the mixture.

In the embodiment, the raw materials in S1 include 38 parts of coffee grounds, 70 parts of polypropylene resin, 3.5 parts of compatibilizer, 6 parts of toughening agent, 2 part of diffusing agent, 1-3 parts of maleic anhydride, 0.7-1.6 parts of anti-UV agent, 4.5 parts of antioxidant, 1.5 part of white oil, and 0.3 part of lubricating agent.

In the embodiment, processing the raw materials in S2 includes the following steps:

first, coffee grounds are prepared for cleaning and drying;

second, the coffee grounds are pulverized and ground by using a pulverizer and a grinder;

third, the coffee grounds powder is screened by using a 150-mesh screen; and fourth, the appropriate coffee grounds powder is weighed out.

In the embodiment, the coffee grounds are washed and cleaned, baked at high temperature to remove grease and be sterilized, and dried at 180-220° C. for 30-40 min to obtain semi-carbonized coffee grounds.

In the embodiment, the coffee grounds are first pulverized by using the pulverizer, and then ground by using the grinder, after guiding out, the 150-mesh screen is used for screening, and the neat and uniform coffee grounds powder is collected.

In the embodiment, mixing the raw materials in S3 includes the following steps:

first, the coffee grounds powder and the polypropylene resin are added into a mixer for primary mixing, modification is performed, and the compatibilizer is intermittently added;

second, the remaining raw materials are added into the mixer for secondary mixing; and Third, the mixture is collected and guided into a double-screw extruder.

In the embodiment, during the primary mixing, a mixing temperature is set at 45° C., a rotating speed is 280 r/min, mixing is performed for 22 min, and the polypropylene resin is modified with coffee grounds powder fibers.

In the embodiment, a funnel is used, an electromagnetic valve is disposed, the funnel is opened intermittently, the compatibilizer is intermittently added into the mixer, and mixed with the coffee grounds powder and the polypropylene resin, and a modification effect is improved.

In the embodiment, during the secondary mixing, a mixing temperature is set at 65° C., a rotating speed is 400 r/min, and mixing is performed for 15 min.

In the embodiment, in S4, the mixture is added to a double-screw extruder, a strip material is extruded under conditions with a temperature of 170-200° C., a rotating speed of 260-300 r/min, and a main feeding frequency of 7-9 Hz, and after cooling with cold water, pelletizing is performed by using an extrusion pelletizer, a rotating speed of the extruder pelletizer is 100-130 Hz/min, and the polypropylene particles are prepared.

Embodiment 3

Referring to the FIGURE, a process for preparing polypropylene particles by using recyclable coffee grounds plant fibers includes the following preparation steps:

S1: raw materials are prepared;

S2: the raw materials are processed;

S3: the raw materials are mixed to obtain a mixture; and

S4: extrusion and granulation are performed on the mixture.

In the embodiment, the raw materials in S1 include 40 parts of coffee grounds, 80 parts of polypropylene resin, 5 parts of compatibilizer, 8 parts of toughening agent, 3 parts of diffusing agent, 3 parts of maleic anhydride, 1.6 parts of anti-UV agent, 6 parts of antioxidant, 2 parts of white oil, and 0.5 part of lubricating agent.

In the embodiment, processing the raw materials in S2 includes the following steps:

first, coffee grounds are prepared for cleaning and drying;

second, the coffee grounds are pulverized and ground by using a pulverizer and a grinder;

third, the coffee grounds powder is screened by using a 150-mesh screen; and fourth, the appropriate coffee grounds powder is weighed out.

In the embodiment, the coffee grounds are washed and cleaned, baked at high temperature to remove grease and be sterilized, and dried at 180-220° C. for 30-40 min to obtain semi-carbonized coffee grounds.

In the embodiment, the coffee grounds are first pulverized by using the pulverizer, and then ground by using the grinder, after guiding out, the 150-mesh screen is used for screening, and the neat and uniform coffee grounds powder is collected.

In the embodiment, mixing the raw materials in S3 includes the following steps:

first, the coffee grounds powder and the polypropylene resin are added into a mixer for primary mixing, modification is performed, and the compatibilizer is intermittently added;

second, the remaining raw materials are added into the mixer for secondary mixing; and third, the mixture is collected and guided into a double-screw extruder.

In the embodiment, during the primary mixing, a mixing temperature is set at 50° C., a rotating speed is 300 r/min, mixing is performed for 25 min, and the polypropylene resin is modified with coffee grounds powder fibers.

In the embodiment, a funnel is used, an electromagnetic valve is disposed, the funnel is opened intermittently, the compatibilizer is intermittently added into the mixer, and mixed with the coffee grounds powder and the polypropylene resin, and a modification effect is improved.

In the embodiment, during the secondary mixing, a mixing temperature is set at 70° C., a rotating speed is 360-500 r/min, and mixing is performed for 10-20 min.

In the embodiment, in S4, the mixture is added to the double-screw extruder, a strip material is extruded under conditions with a temperature of 170-200° C., a rotating speed of 260-300 r/min, and a main feeding frequency of 7-9 Hz, and after cooling with cold water, pelletizing is performed by using an extrusion pelletizer, a rotating speed of the extruder pelletizer is 100-130 Hz/min, and the polypropylene particles are prepared.

Embodiment 4

Referring to the FIGURE, a process for preparing polypropylene particles by using recyclable coffee grounds plant fibers includes the following preparation steps:

S1: raw materials are prepared;

S2: the raw materials are processed;

S3: the raw materials are mixed to obtain a mixture; and

S4: extrusion and granulation are performed on the mixture.

In the embodiment, the raw materials in S1 include 40 parts of coffee grounds, 10 parts of coffee shells, 5 kg parts of compatibilizer, 8 kg parts of toughening agent, 3 kg parts of diffusing agent, 3 parts of maleic anhydride, and 1.6 parts of anti-UV agent.

In the embodiment, processing the raw materials in S2 includes the following steps:

first, coffee grounds are prepared for cleaning and drying;

second, the coffee grounds are pulverized and ground by using a pulverizer and a grinder;

third, the coffee grounds powder is screened by using a 150-mesh screen; and fourth, the appropriate coffee grounds powder is weighed out.

In the embodiment, the coffee shells and the coffee grounds are separately washed and cleaned, baked at high temperature to remove grease and be sterilized, and dried at 180-220° C. for 30-40 min to obtain semi-carbonized coffee grounds and coffee shells.

In the embodiment, the coffee grounds and the coffee shells are first pulverized by using the pulverizer, and then ground by using the grinder, after guiding out, the 150-mesh screen is used for screening, and the neat and uniform coffee grounds powder and coffee shell powder are collected.

In the embodiment, mixing the raw materials in S3 includes the following steps:

First, the coffee grounds powder, the coffee shell powder and the maleic anhydride are added into a mixture for primary mixing;

second, the remaining raw materials are added into the mixer for secondary mixing; and third, the mixture is collected and guided into a double-screw extruder.

In the embodiment, during mixing, a mixing temperature is set at 70° C., a rotating speed is 360-500 r/min, and mixing is performed for 10-20 min.

In the embodiment, in S4, the mixture is added to the double-screw extruder, a strip material is extruded under conditions with a temperature of 170-200° C., a rotating speed of 260-300 r/min, and a main feeding frequency of 7-9 Hz, and after cooling with cold water, pelletizing is performed by using an extrusion pelletizer, a rotating speed of the extruder pelletizer is 100-130 Hz/min, and the polypropylene particles are prepared.

Embodiment 5

Properties of extruded materials are detected, and the tensile toughness, strength and degree of degradation of particles are detected.

|  | Tensile property | Material strength | Degree of degradation under the same condition |
| --- | --- | --- | --- |
| Embodiment 1 | 18 Mpa | 11 Mpa | 94% |
| Embodiment 2 | 17.5 Mpa | 10 Mpa | 96% |
| Embodiment 3 | 18.8 Mpa | 11 Mpa | 95% |
| Embodiment 4 | 18.9 Mpa | 12 Mpa | 96% |

The above description is only a preferred specific implementation of the present disclosure, but the protection scope of the present disclosure is not limited to this. The equivalent replacement or change made by any skilled in the art who are familiar with the technical field within the technical scope disclosed by the present disclosure according to the technical solution of the present disclosure and the inventive concept thereof shall be included within the protection scope of the present disclosure.

What is claimed is:

1. A process for preparing polypropylene particles by using recyclable coffee grounds plant fibers, comprising the following preparation steps:
   1) preparing raw materials comprising of polypropylene and coffee grounds;
   2) processing the raw materials;
   3) mixing the raw materials processed in step 2 to obtain a mixture; and
   4) performing extrusion and granulation on the mixture to obtain the polypropylene particles;
   wherein the raw materials in step 1 comprise 35-40 parts by mass of coffee grounds, 60-80 parts by mass of polypropylene resin, 2-5 parts by mass of a compatibilizer, 4-8 parts by mass of a toughening agent, 1-3 parts by mass of a diffusing agent, 1-3 parts by mass of maleic anhydride, 0.7-1.6 parts by mass of an anti-UV agent, 3-6 parts by mass of an antioxidant, 1-2 parts by mass of a white oil, and 0.1-0.5 part by mass of a lubricating agent.

2. The process according to claim 1, wherein step 2 comprises the following steps:
   2.1) preparing the coffee grounds for cleaning and drying;
   2.2) pulverizing and grinding the coffee grounds by using a pulverizer and a grinder to obtain coffee grounds powder;
   2.3) screening the coffee grounds powder by using a 150-mesh screen; and
   2.4) weighing out the coffee grounds powder screened from step 2.3.

3. The process according to claim 2, wherein in step 2.1, the coffee grounds are washed and cleaned, baked at a high temperature to remove grease and be sterilized, and dried at 180-220° C. for 30-40 minutes to obtain semi-carbonized coffee grounds.

4. The process according to claim 2, wherein in step 2.2, the coffee grounds are first pulverized by using the pulverizer, and then ground by using the grinder; and in step 2.3, the 150-mesh screen is used for screening, and the coffee grounds powder with a uniform size is collected.

5. The process according to claim 1, wherein
   in step 2, the coffee grounds are processed into coffee grounds powder; and
   step 3 comprises the following steps:
   3.1) adding the coffee grounds powder and the polypropylene resin into a mixer for a primary mixing, performing a resin modification, and intermittently adding the compatibilizer;
   3.2) adding a remaining of the raw materials into the mixer for a secondary mixing to obtain the mixture, wherein the remaining of the raw materials comprises the toughening agent, the diffusing agent, the maleic anhydride, the anti-UV agent, the antioxidant, the white oil, and the lubricating agent; and
   3.3) collecting the mixture and guiding the mixture into a double-screw extruder.

6. The process according to claim 5, wherein in step 3.1, during the primary mixing, a mixing temperature is set at 40-50° C., a rotating speed is 260-300 r/min, the primary mixing is performed for 20-25 min, and the polypropylene resin is modified with the coffee grounds powder.

7. The process according to claim 5, wherein in step 3.1, a funnel is used, an electromagnetic valve is disposed on the funnel, and the funnel is opened intermittently so that the compatibilizer is intermittently added into the mixer, and mixed with the coffee grounds powder and the polypropylene resin to facilitate the resin modification.

8. The process according to claim 5, wherein in step 3.2, during the secondary mixing, a mixing temperature is set at 60-70° C., a rotating speed is 360-500 r/min, and the secondary mixing is performed for 10-20 min.

9. The process according to claim 1, wherein step 4 comprises:
   extruding the mixture using a double-screw extruder to obtain a strip material, wherein the strip material is extruded under the following conditions: a temperature of 170-200° C., a rotating speed of 260-300 r/min, and a main feeding frequency of 7-9 Hz,
   after cooling the strip material with cold water, pelletizing the cooled strip material by using an extrusion pelletizer to prepare the polypropylene particles, wherein a rotating speed of the extruder pelletizer is 100-130 Hz/min.

* * * * *